United States Patent [19]

Lacquit et al.

[11] Patent Number: 5,557,785
[45] Date of Patent: Sep. 17, 1996

[54] OBJECT ORIENTED MULTIMEDIA INFORMATION SYSTEM USING INFORMATION AND MULTIPLE CLASSES TO MANAGE DATA HAVING VARIOUS STRUCTURE AND DEDICATED DATA MANAGERS

[75] Inventors: Hubert Lacquit, Maisons Alfort; Christophe Damier, Savigny sur Orge, both of France

[73] Assignee: Alcatel Alsthom Compagnie Generale d'Electricite, Paris Cedex, France

[21] Appl. No.: 160,203

[22] Filed: Dec. 2, 1993

[30] Foreign Application Priority Data

Dec. 3, 1992 [FR] France .................................... 92 14584

[51] Int. Cl.⁶ .................................................. G06F 15/40
[52] U.S. Cl. .................................... 395/600; 364/DIG. 1; 364/282.1; 364/284; 364/286
[58] Field of Search ...................................... 395/700, 600

[56] References Cited

U.S. PATENT DOCUMENTS

| | | | |
|---|---|---|---|
| 5,181,162 | 1/1993 | Smith et al. | 364/419 |
| 5,212,787 | 5/1993 | Baker et al. | 395/600 |
| 5,280,610 | 1/1994 | Travis, Jr. et al. | 395/600 |
| 5,297,279 | 3/1994 | Bannon et al. | 395/600 |
| 5,335,346 | 8/1994 | Fabbio | 395/600 |
| 5,341,478 | 8/1994 | Travis, Jr. et al. | 395/200 |

FOREIGN PATENT DOCUMENTS 0408812  1/1991  European Pat. Off. .

OTHER PUBLICATIONS

IEEE Computer Society Office Automation Symposium Apr. 29, 1987, Gaithersburg, MD, US, pp. 36–45; Y. Masunaga: "Multimedia database: A formal framework".

IEEE Micro, vol. 7, No. 2, Apr. 1987, New York, US, pp. 53–65, K. Sakamura: "BTRON: The business-oriented operating system".

Computer, vol. 24, No. 10, Oct. 1991, Long Beach, US, pp. 42–50, T. D. C. Little et al.: "Spatio–temporal composition of distributed multimedia objects for value–added networks".

Primary Examiner—Kevin A. Kriess
Attorney, Agent, or Firm—Sughrue, Mion, Zinn, Macpeak & Seas

[57] ABSTRACT

A multimedia information system (1) for managing heterogeneous data having various structures and divided between dedicated data managers (2, 3, 4) in which said data is represented by an object-oriented data model comprising a first class describing properties common to all the objects manipulated by the information system characterized in that said object-oriented model further comprises a second class describing properties relative to the use of functions of the data managers and in that said first class includes a property which references at least one instance of said second class.

2 Claims, 2 Drawing Sheets

OBJECT ORIENTED MULTIMEDIA INFORMATION SYSTEM USING INFORMATION AND MULTIPLE CLASSES TO MANAGE DATA HAVING VARIOUS STRUCTURE AND DEDICATED DATA MANAGERS

The invention concerns a multimedia information system for managing heterogeneous data having various structures and divided between dedicated data managers in which said data is represented by an object-oriented data model comprising a first class describing properties common to all the objects manipulated by the information system.

Multimedia information systems are systems for accessing and manipulating heterogeneous data such as alphanumeric information, text, structured data, digitized pictures, video clips, etc.

At present such heterogeneous data is managed by dedicated systems called data managers hereinafter.

Many data managers are available off the shelf, ranging from dedicated hardware (videodiscs, digital optical discs, etc) to software of more or less general application (relational database management systems, geographical information systems, document management systems, etc).

A multimedia information system is known from document EP 459683. That information system has the following drawbacks.

The data managed by that information system originates exclusively from relational database management systems. Using data from other types of data manager, such as those mentioned previously, raises problems concerning access to and manipulation of the data. To use the functions of a particular data manager, such as a videodisc or a geographical information system, these functions must be integrated into each class describing the data of that manager.

The object of the invention is to remedy this drawback. Specifically, the invention is intended to provide a multimedia information system which can allow for the diversity of types of data manipulated by heterogeneous data managers and provide the user with an integral overview of all the data.

An information system of this kind finds many applications in office automation, for example.

To this end the invention consists in a multimedia information system as defined above characterized in that said object-oriented model further comprises a second class describing properties relative to the use of functions of the data managers and in that said first class includes a property which references at least one instance of said second class.

Since the data managers are accessed via a common object-oriented data model, the problem caused by the distribution of the data can easily be solved by using techniques analogous to those used to manage distributed databases.

This information system solves the problem caused by the integration of heterogeneous managers by using a representation of each manager integrated. This representation supports the description of the functions associated with each manager and is used by the information system to access the data of each manager through the property linking said first class ("Class" class) to said second class ("Datamanager" class).

The invention is described in detail below with reference to the drawings.

Figure 1:
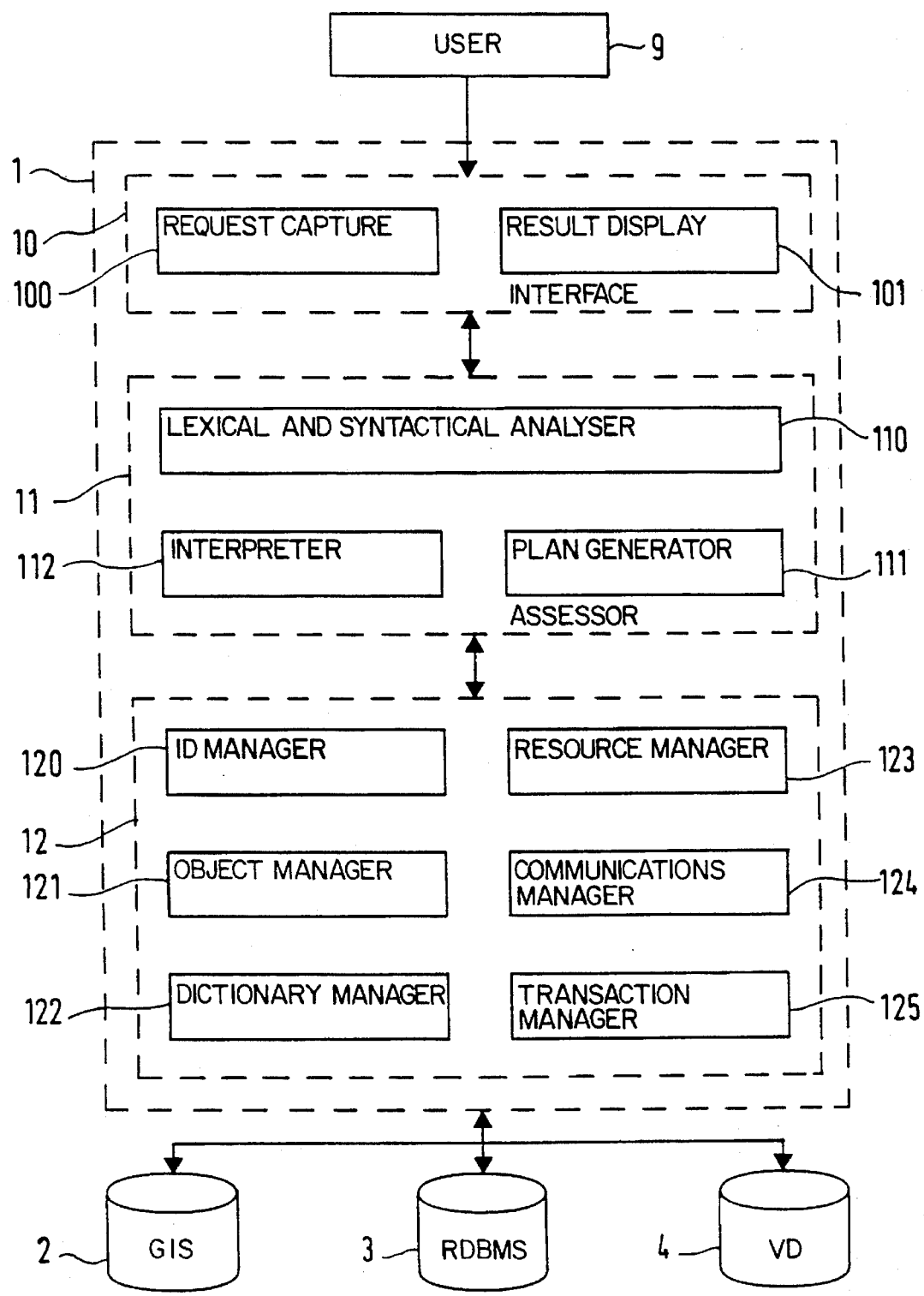
FIG. 1 is a diagram showing the architecture of a multimedia information system in accordance with the invention.

Referring to FIG. 1, the multimedia information system 1 has a first or interface software layer 10, a second or assessor software layer 11 and a third or kernel software layer 12. In the embodiment shown all the software layers are implemented in C++. It is to be understood that they could equally well be implemented in a different object-oriented programming language. These software layers constitute a program which can be loaded into any computer whose operating system can run programs in an object-oriented language. The computer is preferably a workstation with a graphic screen supporting display of pictures and alphanumeric text.

A user 9, which may be a human operator or a computer application, interacts with the information system via the interface layer 10. The interface layer 10 includes a module 100 for capturing requests and commands and a module 101 for displaying the results of said requests and commands. The interface layer 10 is preferably adapted to allow the development and/or adaptation of software modules in the information system 1 using conventional software development utilities.

The interface layer 10 interacts with the assessor layer 11. The assessor layer 11 comprises a lexical and syntactical analyzer 110 which breaks down each request or command received by the interface layer 10 into identifiable elements of the grammar of a language specific to the information system 1 in order to produce a syntactical tree representing the request or command. It also comprises a plan generator 111 which translates the syntactical tree into an execution tree and an interpreter 112 which activates the kernel layer 12 for each leaf of the execution tree.

The kernel layer 12 manages the objects manipulated by the information system 1 and interacts via a network 5 such as a local area network or a wide area network and appropriate interfaces with dedicated data managers such as a geographical information system (GIS) 2 or a picture manager 4 such as a videodisc player (VD). The kernel layer 12 also interacts with a specific data manager in the form of a relational database management system (RDBMS) 3 such as the "ORACLE" system whose function is described below. In the information system 1 the data of the managers 2, 3, 4 consists of objects of an object-oriented data model.

The kernel layer 12 comprises a module 120 for managing object external identifiers, a module 121 for managing objects in memory, a dictionary manager module 122, a module 123 for managing software resources, a module 124 for managing communications with the data managers and a transaction management module 125. The functions of these modules are described below.

The object-oriented data model used by the multimedia information system 1 of the invention, in the present instance of a metacircular model, is described next.

Figure 2:
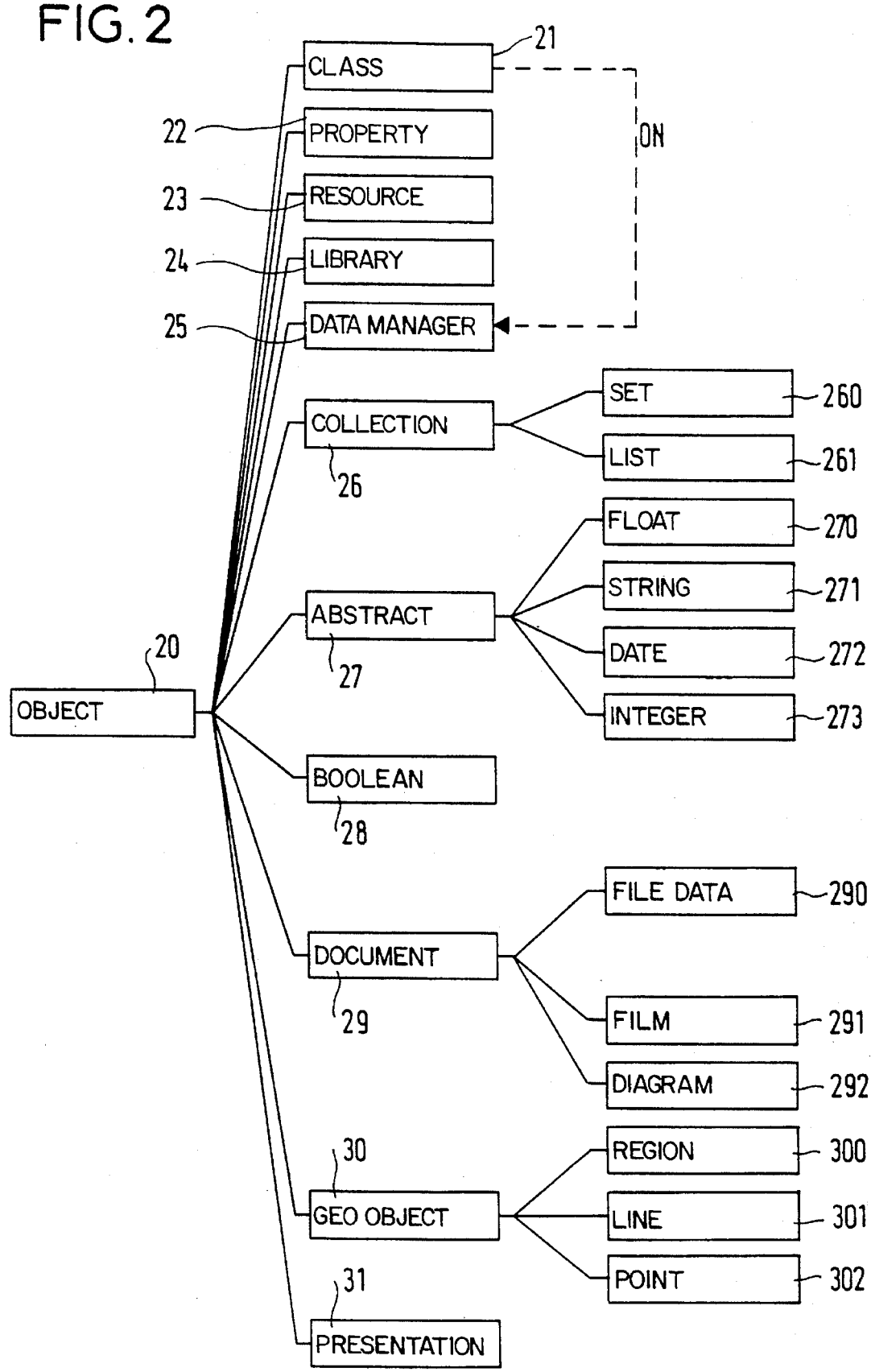
FIG. 2 is a diagram showing the structure of the object-oriented model used by the FIG. 1 multimedia information system.

This object-oriented model is made up of hierarchically organized object classes as shown in FIG. 2, in which the hierarchical order of class dependency runs from left to right.

An object is conventionally an instance of a class. The properties of the class describe the structure of the object. It is to be understood that a dependent class inherits properties from the class from which it is dependent.

The "Object" class 20 describes and groups together the properties common to all the objects manipulated by the information system 1. It includes the following properties:

Name: used to access the external identifier of an object,

Display: used to activate a graphics interface of the object,

?: used to display in alphanumeric form values associated with the properties of an object, =and!=: used to compare two objects, Set: used to update the status of an object, Persist: used to render a temporary object persistent, Types: used to obtain all classes of which the object is an instance, Delete: used to remove an object.

The "Class" class 21 which is dependent from class 20 describes all classes of the object-oriented model and includes the following properties:

New: used to create an instance,

On: specifies the data manager which assures the persistence of instances,

Schema: used to obtain a list of the local properties of instances,

General: used to obtain a list of all local and inherited properties,

Fathers: used to obtain all classes from which it inherits,

Presentation: used to determine the graphical presentation of instances,

Instances: used to obtain all instances in memory,

Insert: used to create and save a new persistent instance,

Read: used to read properties attached to a persistent instance,

Write: used to update values associated with a persistent instance,

Remove: used to delete a class instance.

The properties used to manage associations between objects are also defined by a "Property" class 22 which has the following properties:

Selector: indicates the name of the property,

Range: gives the class of the information associated with the property,

Default: indicates the value returned by default,

Read: indicates the read access mode associated with the property,

Write: indicates the write access mode associated with the property,

Inverse: gives the property executing an inverse process.

The Read and Write properties define the mode of access to the property. To define respective read and write behaviors it is sufficient to assign the Read and Write properties respectively to an instance of the "Resource" class defined below. This way methods are attached to each class. Resources are predefined, for example the "Std" resource which standardizes read or write mode access, i.e. no particular access method is required.

The object-oriented model therefore comprises a "Resource" class 23 which describes the software resources associated with all properties. As explained below, a software resource is a program operating on an object and invoked by means of a property of the object. This class has the following properties:

Selector: indicates the name of the resource,

Range: gives the result type for the resource,

Default: gives the value returned by default,

Parameters: gives a list of the types of the parameters passed to the software resource when it was invoked, Library: gives the library which contains the run time code of the resource, Mode: gives the resource's programming language, Body: gives an entry point to the run time code of the software resource.

The model also comprises the "Library" class 24 which describes the various libraries used by the information system 1 and includes the Path property giving the access path to a given library in the file management system of the operating system used.

The model further comprises the "Datamanager" class 25 which models a data manager by defining the properties associated with transaction management and the properties associated with manipulation of the data supported by the manager. This class therefore includes the following first properties:

Open: for opening a transaction for the data manager concerned,

Close: for closing the transaction on the data manager,

Rollback: for cancelling the current transaction,

Commit: for validating the current transaction.

It includes the following second properties:

Insert: for creating an instance of a class for which the data manager is responsible, Read: for reading information associated with an object of this kind, Write: for updating information associated with an object of this kind, Remove: for deleting an object of this kind.

The object-oriented data model comprises a "Collection" class 26 which describes a collection of objects. This class comprises the following properties:

Cardinal: gives the item number in the collection,

Add: used to add an item to the collection,

Remove: used to remove an item from the collection,

Union and intersection: define the standard union and intersection operators for a collection of objects, Belongs: defines the belonging predicate, Of?: determines the smallest class common to the items of a collection, Of: obliges the item type of the collection to be a subclass of a given class.

Class 26 is dedicated by the classes "Set" 260 (non-ordered collection of non-repeated objects) and "List" 261 (ordered collection of possibly repeated objects).

The basic object types are described by the "Abstract" class 27 which is dedicated by the classes "Float" 270 (positive and negative real numbers), "String" 271 (character strings), "Date" 272 (dates) and "Integer" 273 (positive and negative integers).

The "Boolean" class 28 has only two instances, "True" and "False".

The "Document" class 29 comprises the classes dedicated to processing data managed by the picture manager 4. It includes the following properties:

Title: gives the document title,

Keywords: a set of character strings for selective access to documents using keywords, Abstract: used to obtain a short description of the document, Source: gives information as to the source of the document.

Class 29 is dedicated by the classes "File_data" 290 (multimedia data in the form of files), "Film" 291 (multimedia data in the form of video clips) and "Diagram" 292 (multimedia data in the form of diagrams).

The "Geo_object" class 30 comprises the classes dedicated to the processing of data managed by the geographical information system 2.

Class 30 is dedicated by the classes "Region" 300 for modelling surfaces, "Line" 301 for modelling lines and "Point" 302 for modelling points.

Finally, the graphic interface for displaying any object is defined by the "Presentation" class 31 which has the following properties:

Open: for creating a graphic presentation and recording the link between it and the object, Close: for deleting a graphic representation and the link between it and the object, Expose: for defining display parameters, Editable: to show that an object can be modified using its graphic interface.

The command language used by the multimedia information system 1 is adapted to provide three main command types, namely commands for:

declaring classes and properties, creating, deleting and updating classes, manipulating objects using a request language.

Table 4 shows an example of declaring a class and properties which describe data manipulated by the manager 2.

In this table, "map-scale", "map-theme", "map-bitmap" and "map-component" are properties with standard read and write mode access (the std resource). They are therefore attributes. On the other hand, reading the "map-display" property activates a software resource which is executed by way of the Cdisplay function. Cdisplay is an object in class 23.

The request language is adapted to allow the user 9 to manipulate all the data using concepts of the object-oriented data model (classes, objects, properties and inheritance). Accordingly there are three different request types, namely elementary requests, transactional requests and enquiry requests.

Elementary requests concern simple manipulation of objects or invoking of software resources. They read a property of an object. They are equivalent to the SQL commands "Insert, Update, Delete". Table 1 shows the syntax of an elementary request, in which <type> denotes a class external identifier, <object> denotes an immediate value or an object identifier, <selector> denotes a property selector and the symbol ":" denotes the typing operator.

An elementary request can be used, for example, to delete an object ("Delete" property of class 20), to create a class instance ("New" property of class 21), to render an object persistent ("Persist" property of class 20), etc.

Transactional requests validate or cancel a transaction in progress with a data manager. Table 2 shows the syntax of two transactional requests.

Enquiry requests concern access to data manager data. Their syntax is similar to the SQL syntax (see Table 3).

The functions of the modules of the kernel layer 12 are described next.

The module 120 which manages object external identifiers uses a hashing table (symbol cache) which establishes a corresponding relationship between object external identifiers (Eid) used by the user and object internal identifiers (Pid) used by the kernel layer. The persistence of the correspondences between external and internal identifiers is managed by the relational database management system 3. The function of this module is to retrieve an internal identifier on the basis of an object external identifier.

The module 121 which manages objects in memory also uses a hashing table (object cache) which establishes a corresponding relationship between object internal identifiers (Pid) and the characteristics (properties) of the objects. The persistence of the correspondences between object internal identifiers and object characteristics is also managed by the manager 3. The function of this module is to retrieve the internal representation associated with each object on the basis of the object internal identifier.

The function of the dictionary manager module 122 is to calculate the discriminating property of an object, to calculate the inheritance relationships and to determine the mode to read or write a property using an inheritance graph and a dictionary which establishes a corresponding relationship between constants identifying the properties of classes and the property values of each object.

The software resource manager module 123 uses a dynamic link editor of the operating system, for example the "SunOs 4.1" operating system. As described above, two software resources ("Read" and "Write", class 22) can be associated with each property and are activated selectively when a property is read or written. Activating a software resource for the first time instigates dynamic link editing to enable execution of the code associated with the resource held in a library.

The module 124 managing communications with data managers uses four software resources:

a "Read" resource enabling retrieval of values associated with all properties of a class instance, a "Write" resource for updating these values, an "Insert" resource for saving a new class instance and the values of its properties, a "Remove" resource for deleting a class instance and the values of its properties.

These various resources can be associated with a data manager as explained above. An operation requiring the retrieval of an object from a data manager causes the "Read" resource to be activated. An operation creating a new object or modifying the characteristics of an object retrieved previously causes the "Write", "Insert" and "Remove" resources to be activated to carry out the update in a data manager.

The function of the transaction management module 125 is to manage the opening, closing, validating and cancelling of a transaction involving the information system 1 and one or more data managers using the properties of the instances of the "Datamanager" class 25.

A data manager is federated in the multimedia information system 1 as follows.

The data manager, for example the geographical information system (GIS) 2 is modelled by creating a new instance of the "Datamanager" class 25 as shown in Table 5. For the Open, Close, Commit, Rollback, Insert, Read, Write, Remove properties a software resource that is an instance of the "Resource" class 23 is developed in the C++ language which enables implementation of the operation concerned. These software resources are stored in a library used for dynamic link editing called GISLib in the example. In this example the library GISLib contains all the code associated with the software resources supporting exchanges between the information system 1 and the manager 2. Table 6 shows two examples of resource creation, for example, the "gis-open" and "gis-close" resources which respectively open and close transactions with this manager. In these examples "Body" specifies the entry point into the code of each resource in the GISLib library. "Parameters" lists the types of arguments passed to each of these resources. In this case this list is empty for both the resources. "Mode" shows the language used to write the resources, C++ in this case.

The data manipulated by the manager 4 is then shown by instances of the various classes associated by the "on" property of the "Class" class 21 with the instance of the "Datamanager" class describing the manager 4. In Table 4 the first command defines a new class "Map" whose instances persist in the GIS manager 2. This class has the following properties in addition to the properties common to all classes:

"map-scale", which gives the scale of the map (an instance of class 270),

"map-theme", which briefly describes the nature of the map (an instance of class 271), "map-bitmap", which references a digitized image (an instance of class 290), "map-component", which references a set of items constituting a map (instances of class 30, more specifically classes 300, 301, 302), "map-display", which indicates how to display the map.

The information system 1 operates in the following manner.

Capture of a request or command by module 100 of the interface layer 10 containing at least one object type identifier, one object identifier and one identifier of a property to read.

Assessment of the request or command by modules 110 through 112 of the assessor layer 11 to generate an execution tree.

Execution of the request or command by modules 120 through 125 of the kernel layer 12 on the basis of the execution tree to retrieve the object type, object and property type internal identifiers; search by the information system for the value associated with the "On" property of the object type to retrieve the object describing the data manager implied in the request or command, for example by means of a command of the type [On <object type>]; retrieval of the software resources for accessing and manipulating this object to and by the manager in question; activation of the software resources.

Display of the results by module 101 of the interface layer 10.

Wait for a new request or command to module 100 of the interface layer 10.

A multimedia information system of this kind provides access to a large volume of heterogeneous data divided between existing dedicated servers. Using this type of information system, the operator has no need to concern himself with the data formats specific to a particular data manager, or even with the functions offered by each manager. Federating a new data manager into the information system is relatively simple and does not call into question the application, if any, managing the information system.

TABLE 1

| | | |
|---|---|---|
| <elem_req> | ::= | <object> |
| | \| | <type> : <object> |
| | \| | [<selector> <elem_req>*] |
| | \| | <type> : [<selector><elem_req>*] |
| <type> | ::= | string |
| <object> | ::= | string \|integer\|float\|boolean\|date |
| <selector> | ::= | string \| [<selector> <elem_req>*] |

TABLE 2

| | | |
|---|---|---|
| <validate> | ::= | [ commit ] |
| <cancel> | ::= | [ rollback ] |

TABLE 3

| | | |
|---|---|---|
| <sql-req> | ::= | select <select_list> from <from_list> { where <condition> } |
| <select_list> | ::= | { <select_item> , }* <select_item> |
| <select_item> | ::= | <elem_req> |
| | \| | <var> |
| | \| | <var> . <selector> |
| <from_list> | ::= | { <from_item> , }* <from_item> |
| <from_item> | ::= | <collection> <var> |
| <condition> | ::= | [ <selector> <condition_item>* ] |
| <condition_item> | ::= | <var> . <selector> |
| | \| | <elem_req> |
| | \| | <condition> |
| <selector> | ::= | string |
| | \| | [<selector> <elem_req>*] |
| | \| | [ <selector> <condition_item>* ] |
| <collection> | ::= | string |
| <var> | ::= | string |

TABLE 4

```
[New Class Map On GIS]
[Add  [Schema Map]
      [New Property map-scale
          Range       float
          Read        std
          Write       std]
      [New Property map-theme
          Range       string
          Read        std
          Write       std]
      [New Property map-bitmap
          Range       Image
          Read        std
          Write       std]
      [New Property map-component
          Range       Set
          Read        std
          Write       std]
      [New Property map-display
          Range       Void
          Read        CDisplay
          Write       std]]
```

TABLE 5

```
[New Datamanager GIS
    Open        gis-open
    Close       gis-close]
```

TABLE 6

```
{New Resource gis-open
    Library         GISLib
    Body            "Open"
    Mode            "C++"
    Parameters      ( ) ]
[New Resource gis-close
    Library         GISLib
    Body            "Close"
    Mode            "C++"
    Parameters      ( )]
```

We claim:

1. A multimedia information system for managing heterogenous data having various structures and stored in different dedicated data managers, comprising:

processing means programmed to manipulate said heterogenous data as logical objects of an object-oriented data model wherein said object-oriented data model comprises,
- a first class (21) describing methods and attribute common to all said logical objects manipulated within said processing means, and
- a second class (23) describing first methods for performing transaction operations between said processing means and said data managers and second methods for performing retrieval manipulation and saving operations from said processing means within said data managers, said first class further describing an attribute which references at least one instance of said second class so as to define a logical link between each logical object within said processing means and one of said data managers.

2. The multimedia system according to claim 1 wherein said second class (23) defines first methods relating to the management of transactions between at least one of said data managers and the information system and second methods relating to the retrieval, manipulation and saving of such data by the information system from and to said at least one data manager.

* * * * *